(12) United States Patent
Nakaide et al.

(10) Patent No.: US 9,640,216 B2
(45) Date of Patent: May 2, 2017

(54) REPRODUCTION SYSTEM FOR MAINTAINING SYNCHRONIZATION BETWEEN A FIRST AUDIO CONTENT AND A PLURALITY OF AUDIO CONTENTS DURING SPECIAL REPRODUCTION OF THE FIRST AUDIO CONTENT, AND METHOD AND PROGRAM THEREOF

(75) Inventors: Yushi Nakaide, Kanagawa (JP); Kanta Koda, Kanagawa (JP)

(73) Assignee: PIONEER DJ CORPORATION, Kanagawa (JP)

( * ) Notice: Subject to any disclaimer, the term of this patent is extended or adjusted under 35 U.S.C. 154(b) by 495 days.

(21) Appl. No.: 13/808,490

(22) PCT Filed: Jul. 14, 2010

(86) PCT No.: PCT/JP2010/004563
§ 371 (c)(1),
(2), (4) Date: Jan. 15, 2013

(87) PCT Pub. No.: WO2012/007990
PCT Pub. Date: Jan. 19, 2012

(65) Prior Publication Data
US 2013/0110269 A1    May 2, 2013

(51) Int. Cl.
*G11B 20/10* (2006.01)
*G10H 1/40* (2006.01)

(52) U.S. Cl.
CPC ............. *G11B 20/10* (2013.01); *G10H 1/40* (2013.01); *G10H 2210/241* (2013.01); *G10H 2240/325* (2013.01)

(58) Field of Classification Search
CPC .. G10H 1/0091; G10H 1/40; G10H 2210/076; G10H 2210/125;
(Continued)

(56) References Cited

U.S. PATENT DOCUMENTS

2004/0141526 A1* 7/2004 Balasubramanian et al. .............................. 370/503
2005/0100323 A1 5/2005 Miyashita et al.
(Continued)

FOREIGN PATENT DOCUMENTS

JP          1031495      2/1998
JP       2001-272977    10/2001
(Continued)

OTHER PUBLICATIONS

International Search Report, PCT/JP2010/004563, Oct. 26, 2010.
(Continued)

*Primary Examiner* — Paul McCord
*Assistant Examiner* — Alexander Eljaiek
(74) *Attorney, Agent, or Firm* — Young & Thompson

(57) ABSTRACT

A reproduction system has a content reproduction section 220 that reproduces a content having a cycle; a special reproduction operation section 230 that performs special reproduction on the content by which the content is reproduced at a reproduction position different from a normal reproduction return position at a time of normal reproduction reproduced normally; a special reproduction process section 235 that makes the content reproduction section 220 perform the special reproduction based on an operation of the special reproduction operation section 230; and a return process section 250 that matches the normal reproduction return position of the content with a position corresponding to cycle timing with which the normal reproduction continues without the special reproduction when the normal reproduction returns after the special reproduction is cancelled in case that the special reproduction is performed.

4 Claims, 15 Drawing Sheets

(58) Field of Classification Search
CPC ....... G10H 2210/241; G10H 2210/391; G10H 2240/325; G11B 27/005; G11B 27/007; G11B 27/105; G11B 27/28; G11B 2020/10546
USPC ................ 84/611, 612; 369/4, 47.15, 47.36; 381/119; 700/94
See application file for complete search history.

(56) References Cited

U.S. PATENT DOCUMENTS

| | | | |
|---|---|---|---|
| 2008/0013757 A1* | 1/2008 | Carrier | 381/119 |
| 2009/0223352 A1 | 9/2009 | Matsuda et al. | |
| 2009/0272253 A1 | 11/2009 | Yamashita et al. | |
| 2009/0285563 A1 | 11/2009 | Endo et al. | |
| 2010/0011941 A1* | 1/2010 | Becker et al. | 84/612 |

FOREIGN PATENT DOCUMENTS

| | | |
|---|---|---|
| JP | 2005-108294 | 4/2005 |
| JP | 2006-073043 | 3/2006 |
| JP | 2006073043 | 3/2006 |
| JP | 2007-101772 | 4/2007 |
| JP | 2007101772 | 4/2007 |
| JP | 2007-257771 | 10/2007 |
| JP | 2008-282430 | 11/2008 |
| JP | 2008282430 | 11/2008 |
| JP | 2009-076151 | 4/2009 |
| JP | 2010-008821 | 1/2010 |
| JP | 2010-113278 | 5/2010 |
| WO | 2007-000866 | 1/2007 |
| WO | 2007000866 | 1/2007 |
| WO | WO 20071004541 | 1/2007 |
| WO | WO 2007/066818 | 6/2007 |
| WO | 2007-144994 | 12/2007 |
| WO | 2007144994 | 12/2007 |

OTHER PUBLICATIONS

Japanese Office Action, dated Oct. 18, 2011, in corresponding Japanese Patent Application No. 2011-158517.
Japanese Office Action, dated May 30, 2013, in corresponding Japanese Patent Application No. 2011-158517.
Japanese Office Action, dated Feb. 24, 2014, in corresponding Japanese Patent Application No. 2011-505710.
Japanese Office Action, dated Oct. 18, 2011, in corresponding Japanese Patent Application No. 2011-505710.
Japanese Office Action, dated Feb. 24, 2014, in corresponding Japanese Patent Application No. 2011-158517.
Japanese Office Action, dated Nov. 11, 2015 (drafting date Oct. 31, 2014), in corresponding Japanese Patent Application No. 2011-158517.

* cited by examiner

FIG. 7A

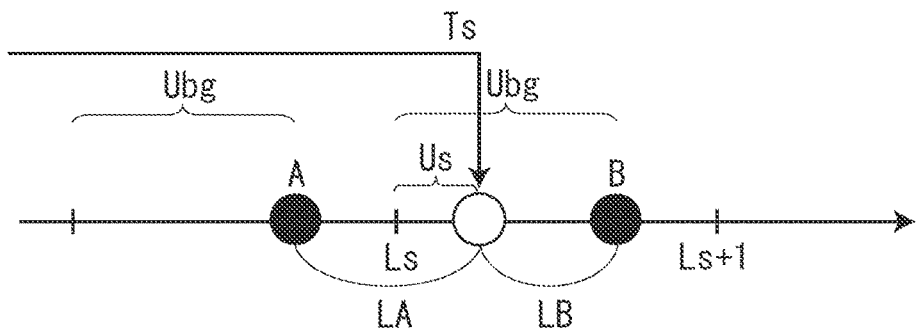

FIG. 7B

■ IF Ubg>Us
LA: (Ls+1−Ls)−Ubg+Us
LB: Ubg−Us

☐ PATTERN 1: RETURN POSITION→A
$$\left\{ \begin{array}{l} =Ts-LA \\ =Ts-\{(Ls+1-Ls)-Ubg+Us\} \end{array} \right\}$$

☐ PATTERN 2: RETURN POSITION→B
$$\left\{ \begin{array}{l} =Ts+LB \\ =Ts+\{Ubg-Us\} \end{array} \right\}$$

☐ PATTERN 3: RETURN POSITION IF LA<LB→A
RETURN POSITION IF LA>LB→B

☐ PATTERN 4: A OR B WHICH SATISFIES Ls ≤ X < Ls+1
(RETURN POSITION IN THE EXAMPLE OF FIG. 7A→B)

■ IF Ubg<Us
LA: Us−Ubg
LB: (Ls+1−Ls)+Ubg−Us

□ PATTERN 1: RETURN POSITION→A
$$\begin{Bmatrix} =Ts-LA \\ =Ts-\{Us-Ubg\} \end{Bmatrix}$$

□ PATTERN 2: RETURN POSITION→B
$$\begin{Bmatrix} =Ts+LB \\ =Ts+\{(Ls+1-Ls)+Ubg-Us\} \end{Bmatrix}$$

□ PATTERN 3: RETURN POSITION IF LA<LB→A
　　　　　　 RETURN POSITION IF LA>LB→B

□ PATTERN 4: A OR B WHICH SATISFIES Ls≦X<Ls+1
　　(RETURN POSITION IN THE EXAMPLE OF FIG. 8A→A)

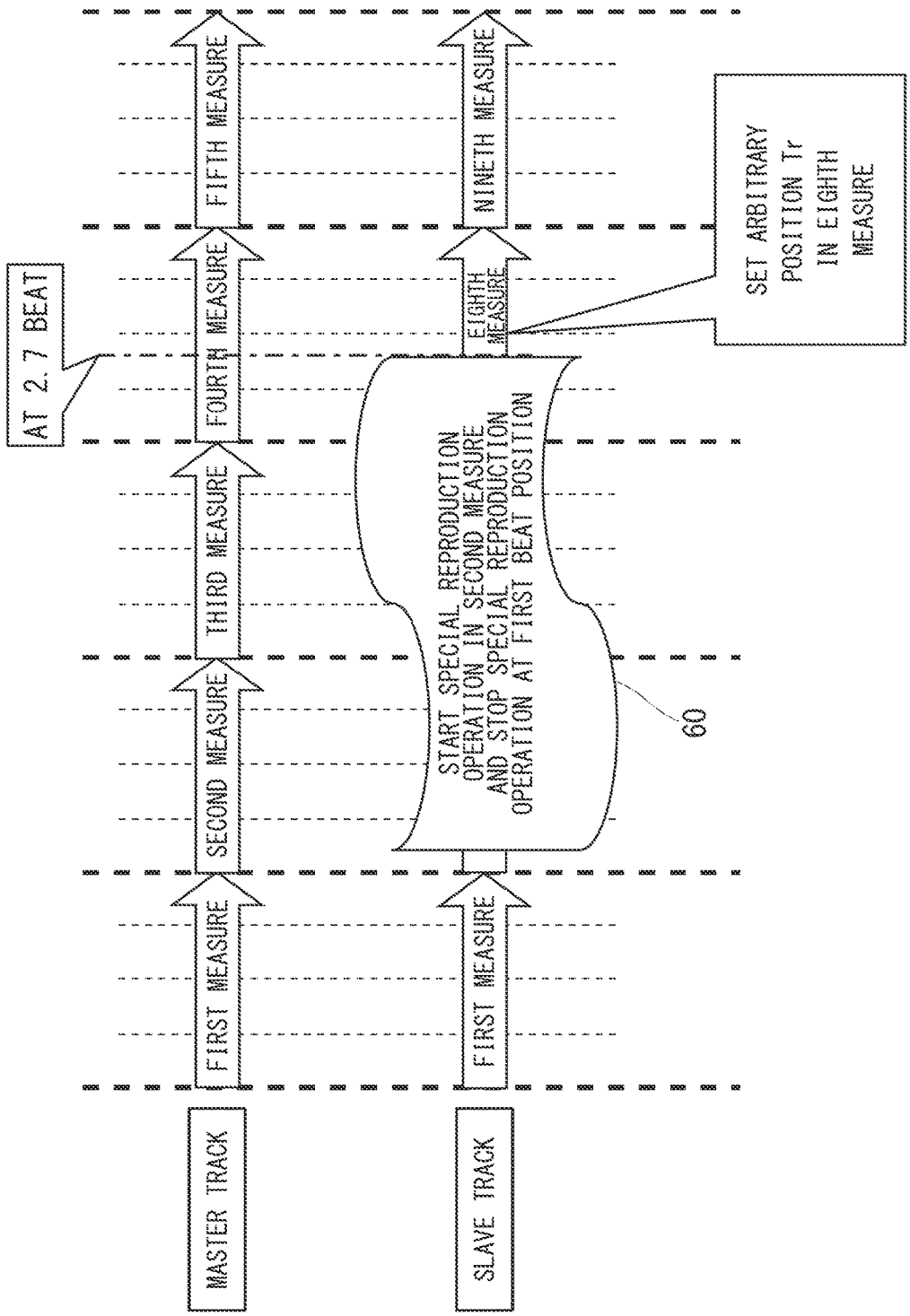

F I G. 1 1 A

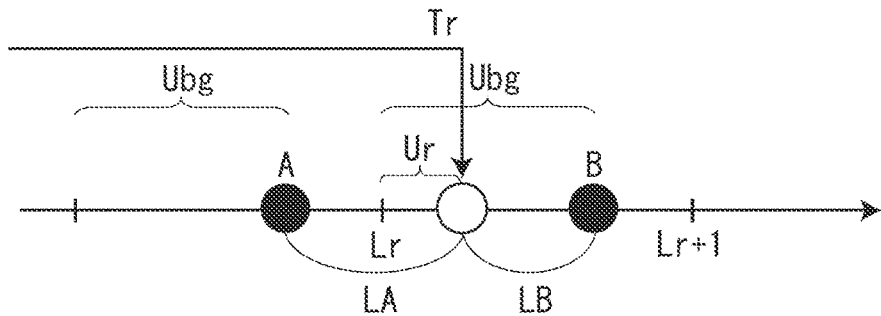

F I G. 1 1 B

■ IF Ubg>Ur
LA: (Lr+1−Lr)−Ubg+Ur
LB: Ubg−Ur

□ PATTERN 1: RETURN POSITION→A
$$\left\{ \begin{array}{l} =Tr-LA \\ =Tr-\{(Lr+1-Lr)-Ubg+Ur\} \end{array} \right\}$$

□ PATTERN 2: RETURN POSITION→B
$$\left\{ \begin{array}{l} =Tr+LB \\ =Tr+\{Ubg-Ur\} \end{array} \right\}$$

□ PATTERN 3: RETURN POSITION IF LA<LB→A
　　　　　　 RETURN POSITION IF LA>LB→B

□ PATTERN 4: A OR B WHICH SATISFIES Lr ≦ X<Lr+1
　　　(RETURN POSITION IN THE EXAMPLE OF FIG. 11A→B)

FIG. 12A

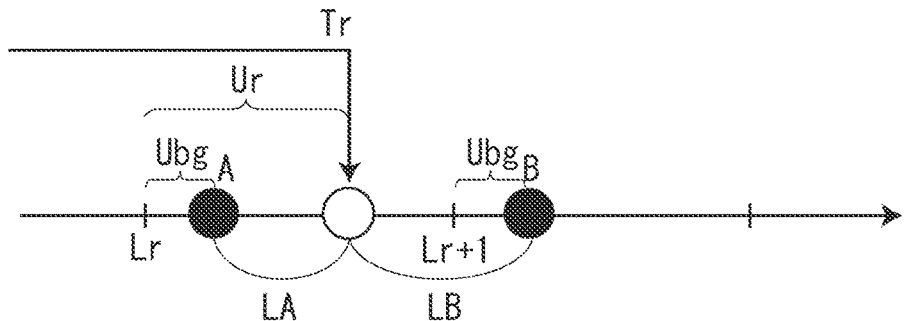

FIG. 12B

■ IF Ubg<Ur
LA: Ur−Ubg
LB: (Lr+1−Lr)+Ubg−Ur

☐ PATTERN 1: RETURN POSITION→A
$$\left\{ \begin{array}{l} =Tr-LA \\ =Tr-\{Ur-Ubg\} \end{array} \right\}$$

☐ PATTERN 2: RETURN POSITION→B
$$\left\{ \begin{array}{l} =Tr+LB \\ =Tr+\{(Lr+1-Lr)+Ubg-Ur\} \end{array} \right\}$$

☐ PATTERN 3: RETURN POSITION IF LA<LB→A
RETURN POSITION IF LA>LB→B

☐ PATTERN 4: A OR B WHICH SATISFIES Lr≦X<Lr+1
(RETURN POSITION IN THE EXAMPLE OF FIG. 12A→A)

F I G. 13
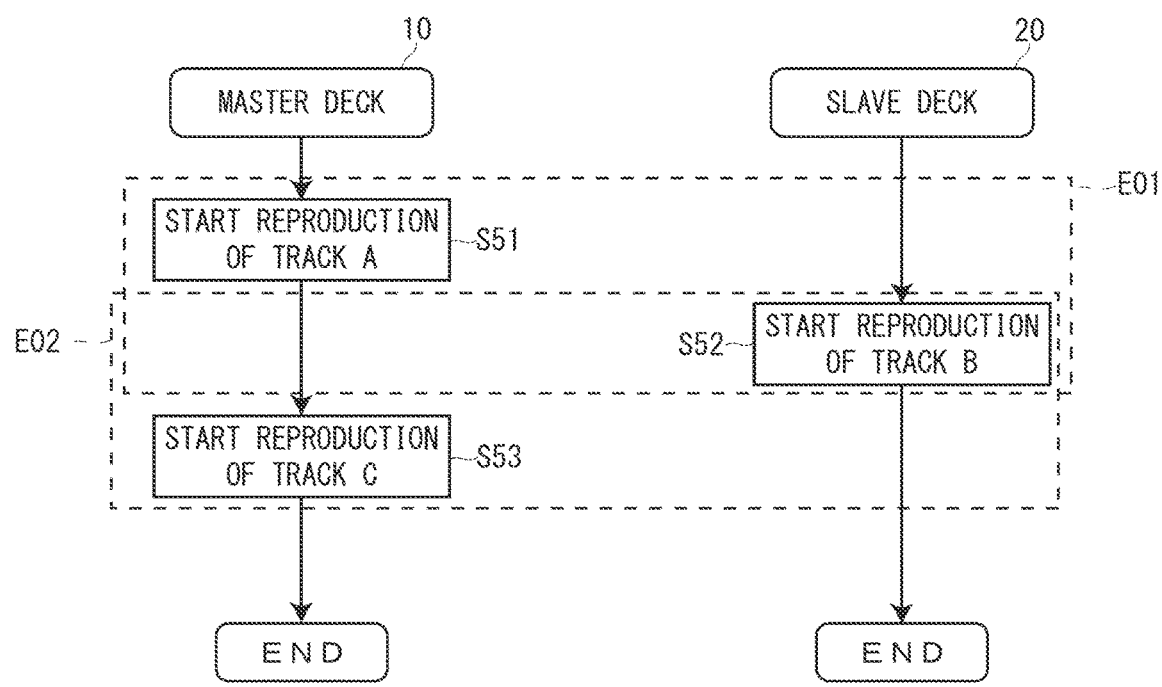

REPRODUCTION SYSTEM FOR MAINTAINING SYNCHRONIZATION BETWEEN A FIRST AUDIO CONTENT AND A PLURALITY OF AUDIO CONTENTS DURING SPECIAL REPRODUCTION OF THE FIRST AUDIO CONTENT, AND METHOD AND PROGRAM THEREOF

TECHNICAL FIELD

The present invention relates to a reproduction system which eliminates a time lag of content reproduction, a reproduction method and a program thereof.

BACKGROUND ART

Conventionally, there has been known a karaoke device which automatically detects a time lag and controls a track progress state when a singer sings out of time with respect to the track progress (see Patent Document 1). With this device, karaoke accompaniment can follow the song of the singer, thereby a poor pitch singer can easily sing.

Such a time lag of content reproduction also occurs in synchronized reproduction of a DJ device. The DJ device is used for live performances which are performed by performers called as disk jockeys with turn tables or the like capable of changing pitch (speed) of tracks. Generally, performances such as DJ mix, scratch etc. are already known and floor excitement is maintained by combining special reproduction while linking tracks smoothly. Further, the synchronized reproduction is a technique by which a track as slave is reproduced in accordance with a tempo of a master track as main track.

DISCLOSURE OF THE INVENTION

Problems that the Invention is to Solve

In case that a special reproduction operation such as a scratch operation is performed at the slave side during the synchronized reproduction, since a reproduction position of the slave side differs from that in normal reproduction, a synchronization relationship is messed up. FIG. 15 illustrates a known example of the foregoing synchronized reproduction. The upper stage indicates a reproduction state of the master track and the lower stage indicates a reproduction state of the slave track in FIG. 15. Further, a measure has four beats (quadruple rhythm). As illustrated in FIG. 15, in case that the special reproduction operation starts in the second measure of the slave track, stops at the first beat position, and a reproduction position of the master track at the operation completion is at 2.7 beat, start position of each measure of the master track and the slave track are got out of position because the slave track is reproduced from the first beat in a measure (here, it is the second measure) at the time of operation completion. In other words, when the special reproduction is canceled and the normal reproduction returns, tempos of the master track and the slave track may be off depending on the cancel timing of the special reproduction. While, in case of the DJ device, since such an out-of-tempos of tracks makes the floor atmosphere spoil, it leads to a crucial problem. Especially, in case of the DJ device, special reproduction operations are frequently performed due to characteristic thereof. Therefore, implementation of a technique has been desired, by which the normal reproduction can be returned while timing is maintained with the master track when the special reproduction is performed.

In view of the above problem, it is an advantage of the invention to provide a reproduction system that can securely maintain tempos even when the special reproduction is performed, a reproduction method and a program thereof.

Means for Solving the Problems

According to one aspect of the invention, there is provided a reproduction system having: a content reproduction device that reproduces a content having a cycle; a special reproduction operation device that performs special reproduction on the content by which the content is reproduced at a reproduction position different from a normal reproduction return position at a time of normal reproduction reproduced normally; a special reproduction process device that makes the content reproduction device perform the special reproduction based on an operation of the special reproduction operation device; and a return process device that matches the normal reproduction return position of the content with a position corresponding to cycle timing with which the normal reproduction continues without the special reproduction when the normal reproduction returns after the special reproduction is cancelled in case that the special reproduction is performed.

According to the other aspect of the invention, there is provided a reproduction method enabling a computer to implement steps of: a content reproduction that reproduces a content having a cycle; a special reproduction operation that operates to perform special reproduction on the content by which the content is reproduced at a reproduction position different from a normal reproduction position at a time of normal reproduction reproduced normally; a special reproduction process that performs the special reproduction based on the operation of the special reproduction operation; and a return process that matches the normal reproduction return position of the content with a position corresponding to cycle timing with which the normal reproduction continues without the special reproduction when the normal reproduction returns after the special reproduction is cancelled in case the special reproduction is performed.

According to the structure, when the special reproduction is performed, it is possible to avoid an out-of-tempos because the normal reproduction return position of the content is matched with a position corresponding to cycle timing at the time of normal reproduction at the time of special reproduction cancellation. In other words, when the special reproduction such as scratch is performed, tempos are maintained by matching the normal reproduction return position of the content with a position in a beat at the time of normal reproduction. With this process, when the invention is applied to a DJ device, even DJ beginners can easily incorporate the special reproduction in their performances because the special reproduction does not spoil an atmosphere in a floor.

The special reproduction indicates scratch, loop, reverse, search, needle search, hot que, action possible to disturb periodicity (such as tempo slider) and the like.

Further, the phrase of "content having periodicity" indicates a content having a constant cycle, which means a content having a constant rhythm interval such as a beat interval or rhythm interval, and the phrase of "cycle timing" indicates a position in a cycle. As to a content having a non-constant cycle, the invention can be applied after the cycle is corrected to be constant.

Still further, the phrase of "matching the normal reproduction return position of the content with a position corresponding to cycle timing with which the normal reproduction continues without the special reproduction" includes a conception such that "matching the normal reproduction return position of the content with a reproduction position with which the normal reproduction continues without the special reproduction".

In the reproduction system described above, it is preferable that, the content reproduction device include a plurality of content reproduction devices to correspond to a plurality of contents. When a special reproduction is performed on one or more of the plurality of contents by the special reproduction process device in a state that the plurality of contents are reproduced in synchronization, the return process device matches one or more normal reproduction return positions of the contents as objects for the special reproduction with positions corresponding to cycle timing of other contents as objects for the normal reproduction among the plurality of contents at a time of the special reproduction cancellation.

According to the structure, it is possible to avoid the out-of-tempos with the content as object for the normal reproduction even when the special reproduction operation is performed because one or more normal reproduction return positions of contents as objects for the special reproduction are matched with positions corresponding to cycle timing of other contents as objects for the normal reproduction in a state that the plurality of contents are reproduced in synchronization.

The phrase of "the plurality of contents are reproduced in synchronization" means that the contents are being reproduced in a state where a synchronization is achieved per at least cycle (such as an beat interval or a rhythm interval).

Further, it is preferable that, in the reproduction system described above, the content reproduction device include a normal reproduction monitoring device that monitors the normal reproduction of the content when the special reproduction operation is performed. The return process device matches the normal reproduction return position of the content reproduced in special reproduction with a position corresponding to a cycle timing of the content monitored by the normal reproduction monitoring device at the time of the special reproduction cancellation.

According to the structure, since the normal reproduction of the content is monitored, it is possible to match the normal reproduction return position of the content with a position corresponding to the cycle timing of the content reproduced in normal reproduction correctly.

As a method of "monitoring the normal reproduction of the content", the normal reproduction of the content may be performed at background. In this case, "reproducing at the background" means reproducing in a state that the content is not output.

In the reproduction system described above, it is preferable that the return process device have a reproduction position judgement device that judges a reproduction position Ts at the time of the special reproduction cancellation of the content reproduced in special reproduction and a reproduction position Tbg at the time of cancellation of the content reproduced in normal reproduction; an in-cycle position calculation device that calculates an in-cycle position Ubg as position in the cycle of the reproduction position Tbg; a return position candidate specifying device that specifies a return position candidate A as the in-cycle position Ubg existing just before the reproduction position Ts and a return position candidate B as the in-cycle position Ubg existing just after the reproduction position Ts given that the in-cycle position Ubg exists in each cycle; a return position determination device that determines the normal reproduction return position from either one of four candidates of the return position candidate A, the return position candidate B, the return position A or B that is closer to the reproduction position Ts, and the return position candidate A or B that is included in the cycle where the reproduction position Ts belongs to; and a return device that matches the reproduction position of the content reproduced in special reproduction with the determined normal reproduction return position.

According to the structure, it is possible to match the normal reproduction return position of the content with either one of return positions "the return position candidate A as the in-cycle position Ubg existing just before the reproduction position Ts", "the return position candidate B as the in-cycle position Ubg existing just after the reproduction position Ts", "the return position candidate A or B that is closer to the reproduction position Ts" and "the return position candidate A or B that is included in the cycle where the reproduction position Ts belongs to. For example, it is possible to start the reproduction after cancelling the special reproduction from the closest position to a position (the reproduction position Ts) where a user intends to return by setting "the return position candidate A or B that is closer to the reproduction position Ts" as return position.

In the reproduction system described above, it is preferable that the reproduction system further have a return target position assignment device that assigns an arbitrary position Tr in the content as return target position. The return process device has a reproduction position judgement device that judges a reproduction position Tbg of the content reproduced in normal reproduction at the time of the special reproduction cancellation; an in-cycle position calculation device that calculates an in-cycle position Ubg as position in the cycle of the reproduction position Tbg; a return position candidate specifying device that specifies a return position candidate A as the in-cycle position Ubg existing just before the arbitrary position Tr and a return position candidate B as the in-cycle position Ubg existing just after the arbitrary position Tr; a return position determination device that determines the normal reproduction return position from either one of four candidates of the return position candidate A, the return position candidate B, the return position A or B that is closer to the arbitrary position Tr, and the return position candidate A or B that is included in the cycle where the arbitrary position Tr belongs to; and a return device that matches the reproduction position of the content reproduced in special reproduction with the determined normal reproduction return position.

According to the structure, the return position can be matched with either one of "a return position candidate A as the in-cycle position Ubg existing just before the arbitrary position Tr", "a return position candidate B as the in-cycle position Ubg existing just after the arbitrary position Tr", "the return position A or B that is closer to the arbitrary position Tr", and "the return position candidate A or B that is included in the cycle where the arbitrary position Tr belongs to". For example, it is possible to start the reproduction after the special reproduction cancellation from the closest position to a position (the arbitrary position Tr) where the user intends to return by setting the return position to "the return position candidate A or B which is closer to the arbitrary position Tr". Further, since the return position can be assigned arbitrary, it is possible to move to a different atmosphere without giving a strange feeling when the user changes tunes by intention or tempos are maintained.

The assignment of the arbitrary position Tr can be made as a reproduction position from the beginning from the content or tune changing position (a verse start position, a climax start position) and the like. Further, the reproduction position from the beginning of the content can be assigned based on an elapsed time from the beginning of the content or the number of cycles (such as the number of beat) counted from the beginning of the content.

In the reproduction system described above, it is preferable that the reproduction system further have a return position selection device that selects which candidate should be determined from the four candidates by the return position determination device.

According to the structure, it is possible to select a return position based on the user's preference or needs.

In the reproduction system described above, it is preferable that plurality of content reproduction devices include a master reproduction device that reproduces a master content as object for the normal reproduction and a slave reproduction device that reproduces a slave content as object for the special reproduction, and the slave reproduction device acquire reproduction position information indicating a reproduction position of the master content from the master reproduction device and perform an acceleration/deceleration process to the slave content based on the reproduction position information to reproduce in synchronization with the master content.

According to the structure, in case that the master content and the slave content are reproduced in synchronization and the special reproduction operation is performed on the slave content, it is possible to avoid an out-of-tempos of the master content and the slave content because the normal reproduction return position of the slave content is matched with cycle timing of the master content. Further, since the slave reproduction device acquires the reproduction position information from the master reproduction device to perform the acceleration/deceleration process to the slave content, it is possible to perform precise synchronized reproduction.

In the above described reproduction system, it is preferable that the slave reproduction device perform the acceleration/deceleration process to the slave content in consideration of communication delay amount due to a network when the master reproduction device and the slave reproduction device are connected via the network.

According to the structure, even when the master reproduction device and the slave reproduction device are separately located, it is possible to perform precise synchronized reproduction in consideration of the communication delay due to the network.

In the above described reproduction system, it is preferable that the cycle be a period on a basis of a beat, a measure, a phrase, tune, or a verse number.

According to the structure, it is possible to apply the invention when synchronized reproduction is performed in which beats, measures (rhythms), phrases, tune (unit on a basis of melody changing positions such as introduction, verse, climax), and verse numbers (such as first part, second part of tracks) are synchronized.

In the above described reproduction system, it is preferable that a program of the invention instruct a computer to perform each step in the reproduction method described above.

It is possible to implement a reproduction method that maintain tempos surely by the program even when the special reproduction is performed.

BRIEF DESCRIPTION OF THE DRAWINGS

FIGS. 7A and 7B are explanatory views for a return process (Ubg>Us) according to the first embodiment.

FIG. 9 is an image diagram of the synchronized reproduction according to a second embodiment.

FIGS. 11A and 11B are explanatory views for the return process (Ubg>Ur) according to the second embodiment.

FIGS. 12A and 12B are explanatory views for the return process (Ubg<Ur) according to the second embodiment.

FIG. 13 is a diagram illustrating a transition between a master reproduction section and a slave reproduction section.

DESCRIPTION OF EXEMPLARY EMBODIMENTS

The First Embodiment

Figure 1:
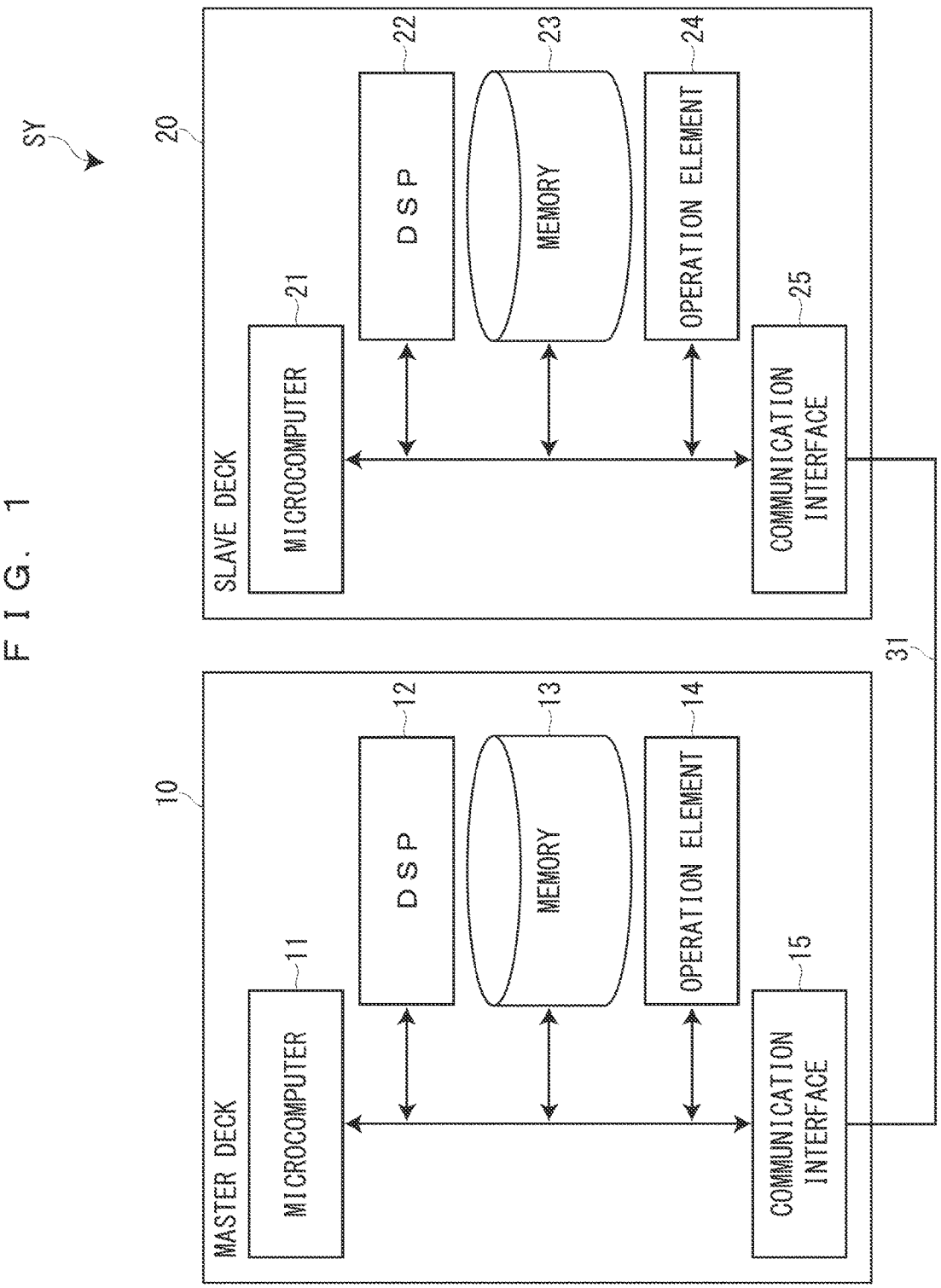
FIG. 1 is a system configuration diagram of a reproduction system.

A reproduction system, a reproduction method and a program thereof according to one embodiment of the invention will be explained in detail with reference to accompanying drawings. FIG. 1 is a system configuration diagram of a reproduction system SY. As illustrated in FIG. 1, the reproduction system SY has a master deck 10 which reproduces master tracks (master contents) as main track and a slave deck 20 which reproduces slave tracks (slave contents) in synchronization with the master tracks. Both of the decks 10, 20 are connected via a cable 31 such as Ethernet (trade mark), and data transmission, at least, from the master deck 10 to the slave deck 20 can be performed.

In the embodiment, the master deck 10 and the slave deck 20 are DJ players (for DJ performances by disc jockeys). Further, tracks reproduced by each deck 10, 20 are already analyzed and the analyzed data is stored in each memory 13, 23 of each deck 10, 20. Also, tracks reproduced by each deck 10, 20 have periodicity. The phrase "have periodicity" indicates to have a constant tempo (rhythm) such that a beat (accent) interval is constant, or a rhythm interval (an accented beat and an unaccented beat following the accented beat) is constant. Further, a track having a non-constant tempo is analyzed after a correction process for rendering the tempo constant is performed.

The master deck 10 has a microcomputer 11, a DSP (Digital Signal Processor) 12, the memory 13, an operation element 14 and a communication interface 15. Explanations for other structure elements (such as a recording medium reading-out mechanism, a reproduction mechanism and a reproduction signal output mechanism) mounted in a general DJ player are omitted. The microcomputer 11 has a reproduction control function which controls reproduction of tracks, a measure information detection function which detects measure information indicating each position of a "measure" as structure unit (period) of a track based on the analyzed data stored in the memory 13, and a measure data calculation function which calculates measure data as data to the next measure. The "measure information" indicates a position of each measure from the beginning of a track, and the "measure data" indicates a length from an arbitrary reproduction position (current position) to a start position of the next measure (such as time, the number of sampling data).

The DSP 12 performs various audio processes such as adjusting reproduction speed. Further, the memory 13 is a non-volatile recording medium and stores the above analyzed data (measure information). Still further, the operation element 14 is used for various operations such as track reproduction operation by a user. Still further, the communication interface 15 is used for transmitting the measure data to the slave deck 20. Reproduction position information (information indicating a reproduction position of the content) in claims corresponds to the "measure data" in the embodiment.

While, the slave deck 20 has a similar structure as that of the master deck 10, and has a microcomputer 21, a DSP 22, a memory 23, an operation element 24 and a communication interface 25. The microcomputer 21 in the slave deck 20 side has, in addition to the measure information detection function and the measure data calculation function, a return process function for starting reproduction of a slave track while maintaining a synchronized state with a master track when a special reproduction operation to the slave track by the operation element 24. Further, the operation element 24 of the slave deck 20 side includes special reproduction operation elements for special reproduction such as scratch. The special reproduction and the special reproduction operation elements is described in FIG. 3 later. Still further, the communication interface 25 of the slave deck 20 side receives the measure data from the master deck 10.

Next, referring to FIG. 2, a functional structure of the reproduction system SY will be explained. The master deck 10 has a master side communication section 110 and a content reproduction section 120 as main functional structure. The master side communication section 110 has a communication interface 15 as main section and communicates with the slave deck 20.

The content reproduction section 120 has the microcomputer 11, the DSP 12 and the reproduction mechanism (not illustrated) as main section and reproduces music contents. Further, the content reproduction section 120 in the master deck 10 side has a master reproduction section 121 and reproduces master tracks. The master tracks are reproduced in normal reproduction (not to be objects for special reproduction).

While, the slave deck 20 has a slave side communication section 210, a content reproduction section 220, a special reproduction operation section 230, a special reproduction process section 235, a return position selection section 240 and a return process section 250 as main functional structure. The slave side communication section 210 has the communication interface 25 as main section and communicates with the master deck 10.

The content reproduction section 220 has the microcomputer 21, the DSP 22 and the reproduction mechanism (not illustrated) as main section and reproduces music contents. Further, the content reproduction section 220 in the slave deck 20 side has a slave reproduction section 221 and reproduces slave tracks. Still further, the slave reproduction section 221 has a slave front side reproduction section which performs a front side process and a background reproduction section which performs a back side process when the special reproduction is performed. The front side process indicates a reproduction process in a state that reproduction signals can be output to an outside and is performed with the special reproduction operation. On the other hand, the back side process monitors the normal reproduction of the slave track (normal reproduction monitoring section). In the embodiment, as the back side process, the slave track is reproduced in the normal reproduction in a state that the reproduction signals are not output to the outside, which is, as it is called, background reproduction. Therefore, the master track reproduced by the master reproduction section 121 and the slave track reproduced by the background reproduction section are always maintained in a synchronized state.

Figure 3:
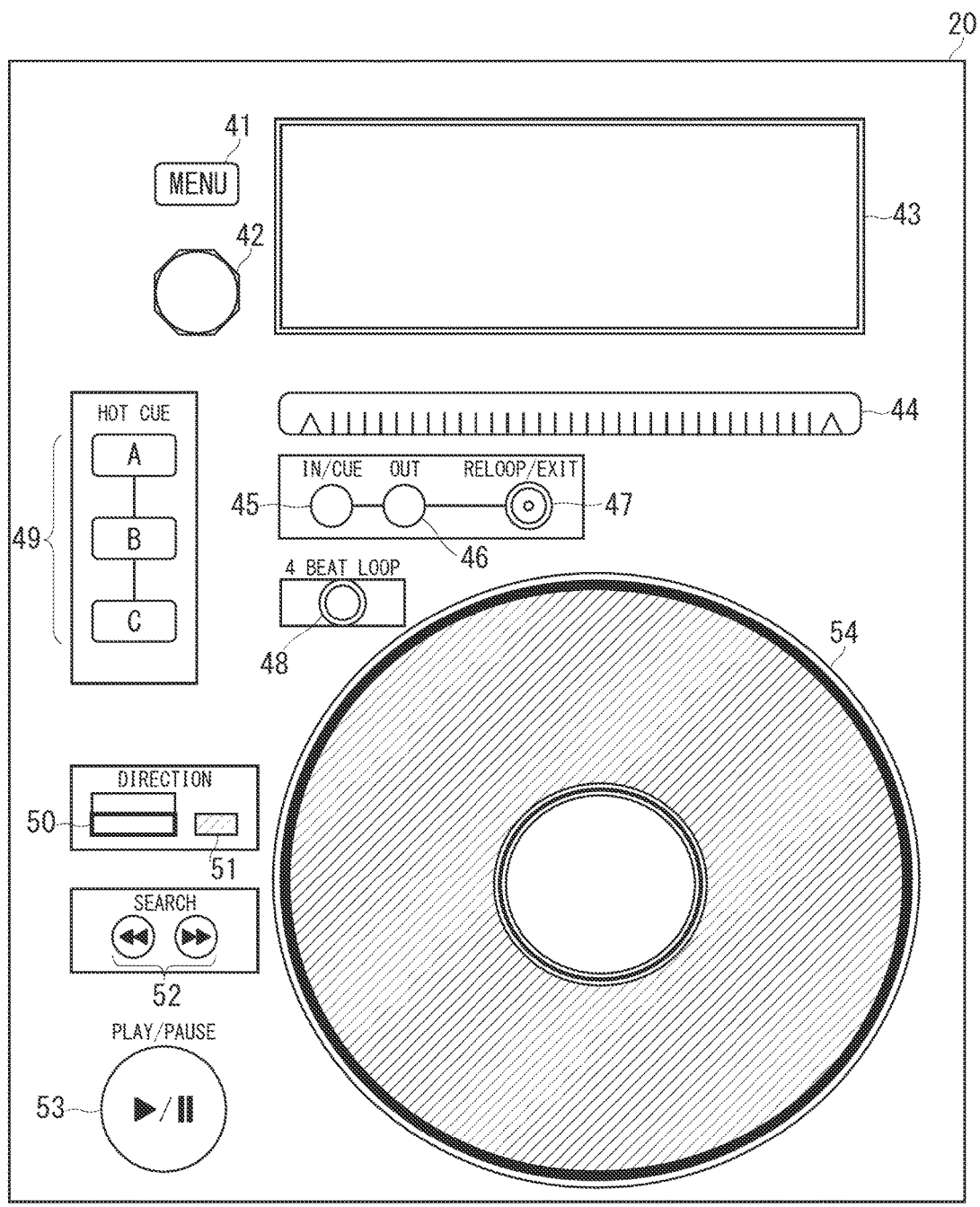
FIG. 3 is a schematic plan view of a slave deck.

The special reproduction operation section 230 has the operation element 24 as main section and performs special reproduction operations by which a reproduction position different from that in the normal reproduction is reproduced for the slave track reproduced in the slave reproduction section 221 (slave front side reproduction section). In other words, the "special reproduction operation" indicates an operation by which the slave track and the master track could be out-of-tempos (the synchronized state collapses). Referring to FIG. 3, a specific example of the special reproduction operation section 230 (special reproduction operation element) and an operation of the special reproduction will be explained.

FIG. 3 is a plan view of the slave deck 20 seen from an upper side. Numerals 41 to 43 functioning as the return position selection section 240 will be explained later. Numeral 44 is a needle search pad for special reproduction "needle search". The "needle search" is a jump function of a reproduction position, and sound around a touched position by touching an arbitrary position on the needle search pad with a finger is instantly reproduced. As soon as the "needle search" starts, the synchronized state is broken up because a reproduction position thereof differs from that of the master track (master deck 10).

Numerals 45 to 48 are a button group used for special reproduction "loop". The "loop" is a repeating reproduction function and reproduces repeatedly a repetition period by defining a start point and a stop point for the repetition reproduction in a track. Further, when the "loop" is cancelled, the normal reproduction returns and the repetition reproduction is not performed even the stop point for the iteration is reached. Numerals 45 and 46 are manual loop buttons for starting and stopping the "loop" manually. Numeral 47 is a cancel button which cancels the "loop". Further, numeral 48 is an automatic loop button which starts/stops the "loop" automatically. When the automatic loop button is pressed down, four beat loop from the pressed position is automatically set in accordance with BPM (Beats Per Minute) of the track being reproduced. In case of performing the "loop", the synchronized state is maintained if the function capable of setting the repetition period automatically in accordance with BPM of the master track (automatic synchronization function) is provided, but, in case of manual setting, the synchronized state collapses depending on the set position (when the loop is performed with timing or length which is asynchronous with rhythm of the master track).

Numeral 49 indicates a button group used for special reproduction "hot que". The "hot que" is a jump function for the reproduction position, and when the hot que button is pressed down, reproduction immediately starts from a preliminary designated (recorded) position in a track. In the example of FIG. 3, three positions can be designated in correspondence with the hot que buttons A, B and C. Since the "hot que" can reproduce from an arbitrary position, a reproduction position thereof differs from that of the master track at a time of starting reproduction even the above mentioned automatic synchronization function is used, leading to breaking up the synchronized state.

Numeral is a switch used for special reproduction "reverse". The "reverse" is a reverse reproduction function, and when the switch is turned on, reverse reproduction starts from the position being reproduced. Further, when the switch is turned off, the normal reproduction starts from the position being reverse reproduced. Numeral 51 is a REV indicator which is lit up during the reverse reproduction. A reproduction position of the "reverse" differs from that of the master track, leading to breaking up the synchronized state.

Numeral 52 indicates a button group used for special reproduction "search". The "search" is a fast-forward/rewind function of a reproduction position, fast-forward/rewind operations are performed when each button is pressed down, and the normal reproduction starts when the pressed button is released. Since the "search" makes a difference with respect to a reproduction position and a reproduction speed with those of the master track at a time of starting the fast-forwarding/rewinding, the synchronized state breaks up.

Numeral 53 indicates a button group used for special reproduction "play". The "play" is a track reproduction function, and when the button is pressed down, the normal reproduction starts from a reproduction position being under suspension or on que standby. Since the "play" reproduces from an arbitrary position, a reproduction position differs from that of the master track at a time of starting reproduction even the above-mentioned automatic synchronization function is used, leading to breaking up the synchronized state.

Numeral 54 is a jog dial used for special reproduction "scratch". The "scratch" reproduces based on a rotation direction and rotation speed of the jog dial when a front surface of the jog dial is pressed and rotated. Further, when the pressing on the front surface is released (a finger is detached), the normal reproduction restarts from the position where the scratch reproduction is being performed. Since differences in terms of a reproduction position and reproduction speed with those of the master track occur when the "scratch" starts, leading to breaking up the synchronized state. As explained above, numerals 44 to 54 are examples of operation elements which implement the special reproduction operation section 230, and other operation elements used for changing the reproduction speed (such as a fader) are included in the special reproduction operation section 230. Further, the special reproduction may be performed by operating to touch a touch panel, a touch pad or the like.

Figure 2:
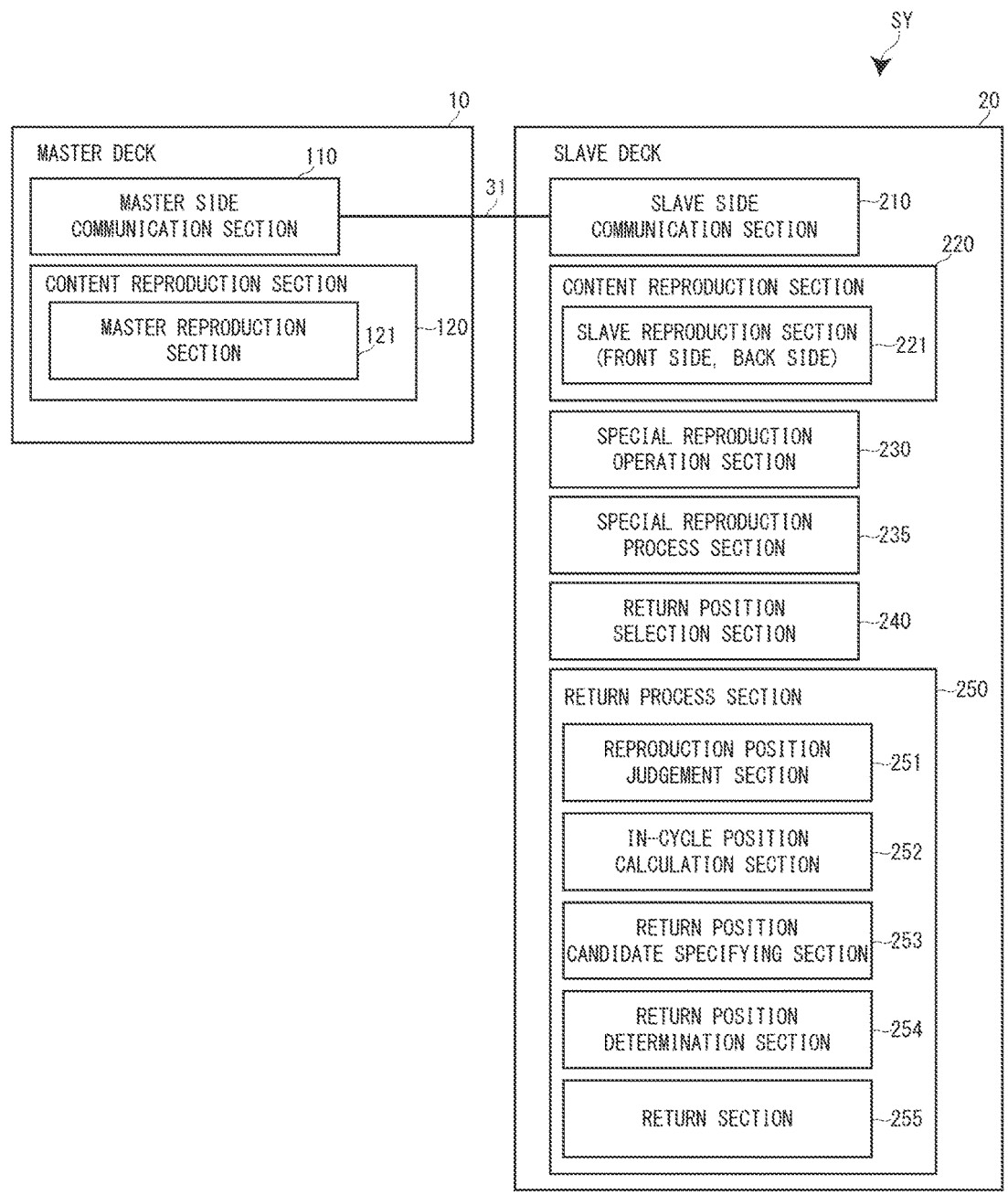
FIG. 2 is a functional block diagram of the reproduction system.

Now, returning to the explanation of FIG. 2, the special reproduction process section 235 has the microcomputer 11, the DSP 12 and a buffer (not illustrated) for storing a part of a track at a time of special reproduction as main section, and has the content reproduction section 220 (slave reproduction section 221) perform the special reproduction based on an operation of the special reproduction operation section 230.

The return position selection section 240 has the operation element 24 as main section and selects which candidate should be determined as return position from four return position candidates by a return position determination section 254 described later. In the embodiment, one of patterns 1 to 4 can be selected based on user's preference or needs (see FIGS. 7A to 8B) and a return position is arbitrarily specified based on the selection of the pattern. A selection operation of the return position selection section 240 is performed with numerals 41 to 43 in FIG. 3. Numeral 41 indicates a menu button, numeral 42 indicates a rotary selector, and numeral 43 indicates a liquid crystal display. Specifically, options for selecting one of the patterns 1 to 4 are displayed on the quid crystal display by pressing down the menu button, either one of options is selected by the rotary selector, and a pattern is determined by pressing down the rotary selector.

The return process section 250 has the microcomputer 21 and the DSP 22 as main section, and in case of performing a special reproduction operation, performs to correspond a normal reproduction return position (return position when the normal reproduction is returns) of a slave track to an in-measure position of a master track (an in-measure position of the slave track being reproduced in the background reproduction section="cycle timing" in claims). As illustrated in FIG. 2, the return process section 250 has a reproduction position judgement section 251, an in-cycle position calculation section 252, a return position candidate specifying section 253, the return position determination section 254 and a return section 255.

Figure 4:
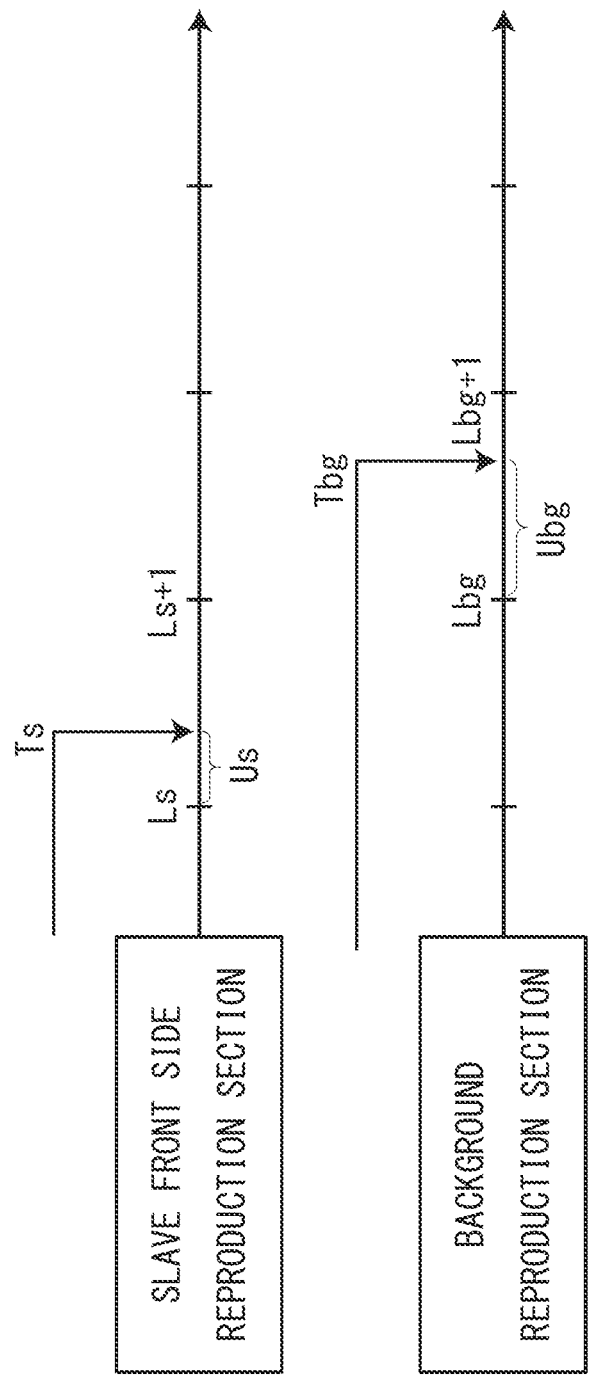
FIG. 4 is a diagram illustrating reproduction positions of a slave front side reproduction section and a background reproduction section.

The reproduction position judgement section 251 judges a reproduction position Ts at a time of special reproduction cancellation of a slave track which is reproduced in special reproduction by the slave front side reproduction section and a reproduction position Tbg at the time of cancellation of the slave track reproduced in the normal reproduction by the background reproduction section. FIG. 4 illustrates these reproduction positions Ts and Tbg on a time axis. In FIG. 4, scales on each time axis indicate definition of a measure (cycle).

Further, the in-cycle position calculation section 252 calculates an in-cycle position Us as a position in the measure of the reproduction position Ts (position from the start point of the measure) and an in-cycle position Ubg as a position in the measure of the reproduction position Tbg (see FIG. 4).

Figures 8A, 8B:
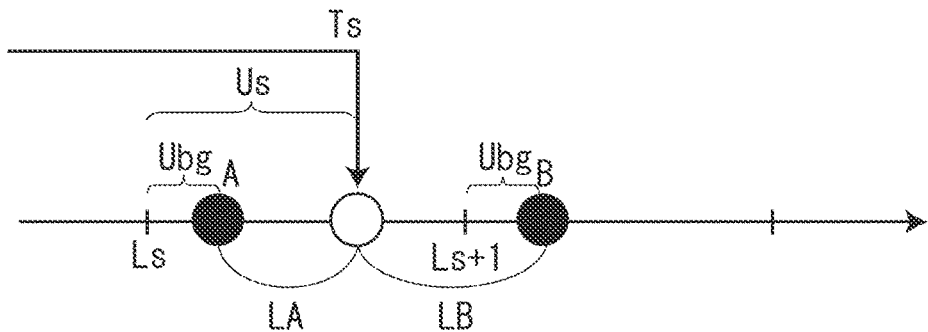
FIGS. 8A and 8B are explanatory views for the return process (Ubg<Us) according to the first embodiment.

Still further, the return position candidate specifying section 253 specifies a return position candidate A as the in-cycle position Ubg existing just before the reproduction position Ts and a return position candidate B as the in-cycle position Ubg existing just after the reproduction position Ts given that the in-cycle position Ubg exists in each measure (see FIGS. 7A and 8A).

Further, the return position determination section 254 determines a normal reproduction return position based on the specified return position candidates A, B and the pattern selected by the return position selection section 240. Still further, the return section 255 sets (jumps) a reproduction position of the slave track to the normal reproduction return position determined by the return position determination section 254.

Figure 5:
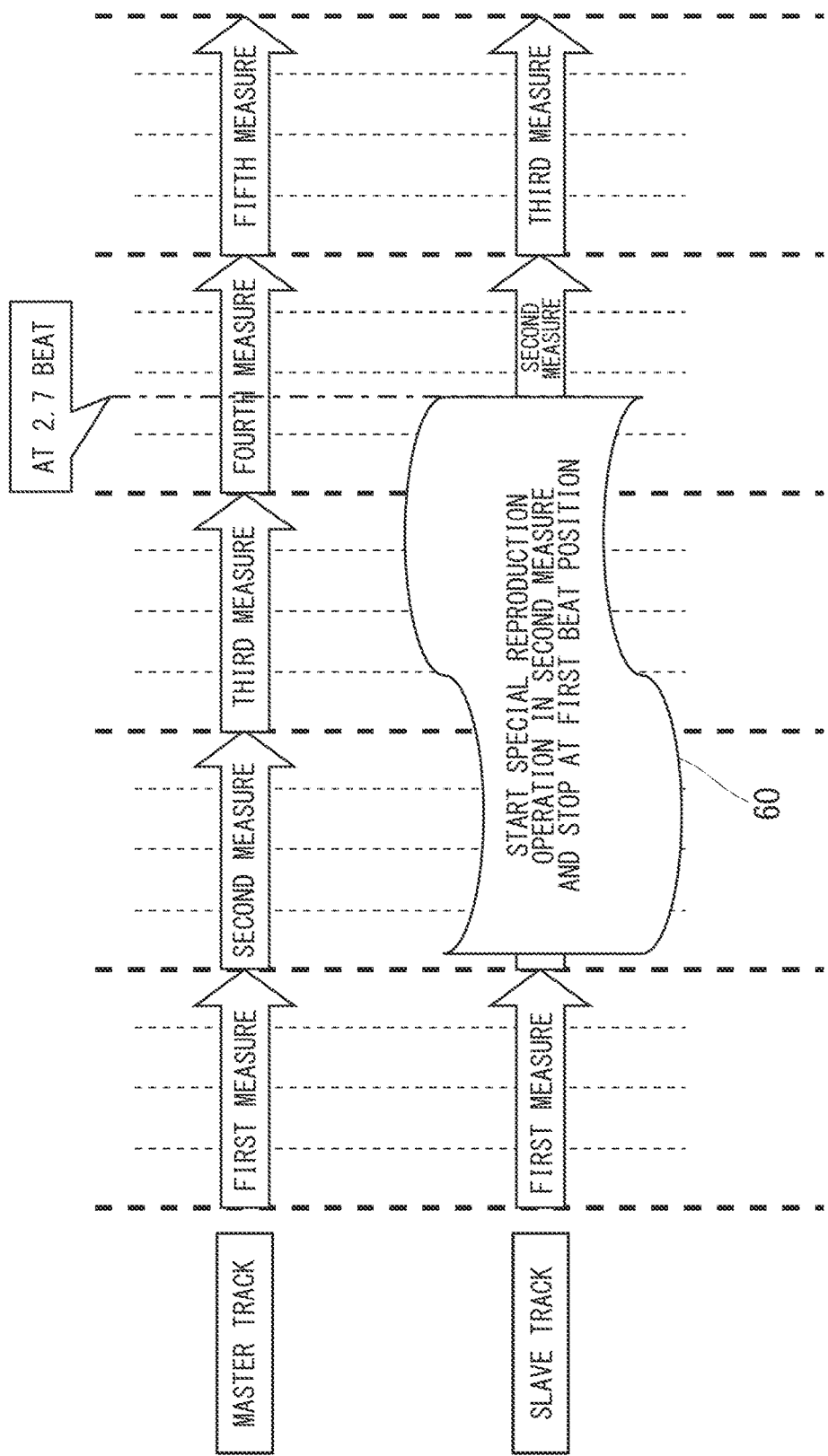
FIG. 5 is an image diagram of synchronized reproduction according to a first embodiment.

Thus, it is possible to maintain the synchronized state with a master track by the process of the return process section 250 even special reproduction on a slave track is performed. FIG. 5 is an image diagram of the synchronized reproduction of a master track and a slave track according to the embodiment. The upper stage in FIG. 5 illustrates a reproduction state of the master track and the lower stage in FIG. 5 illustrates a reproduction state of the slave track. Further, thick dotted lines indicate definitions of measures and thin dotted lines indicate definitions of beats. In other words, the example in FIG. 5 is a quadruple rhythm music, the thick dotted line indicates an accented beat of the first beat, and the thin dotted lines indicate unaccented beats of the second, third and fourth beat from a left side. Still further, numeral 60 indicates a period in which special reproduction is performed. As illustrated in FIG. 5, in case that an special reproduction operation starts, for example, in the second measure on the slave side and stops the special reproduction operation at the first beat position in the second measure, and that a reproduction position of the master track at a time of operation completion is at 2.7 beat, the return process is performed to start reproduction of the slave track not from the first beat in the second measure at the time of operation completion but from the 2.7 beat in the second measure. With this process, out-of-tempos between the master track and the slave track can be cancelled. Note that FIG. 5 illustrates an example in which either one of the patterns 2 to 4 is selected by the return position selection section 240 (in case that the pattern 1 is selected, a different return position is set). A detail of each pattern is described later.

Figure 6:
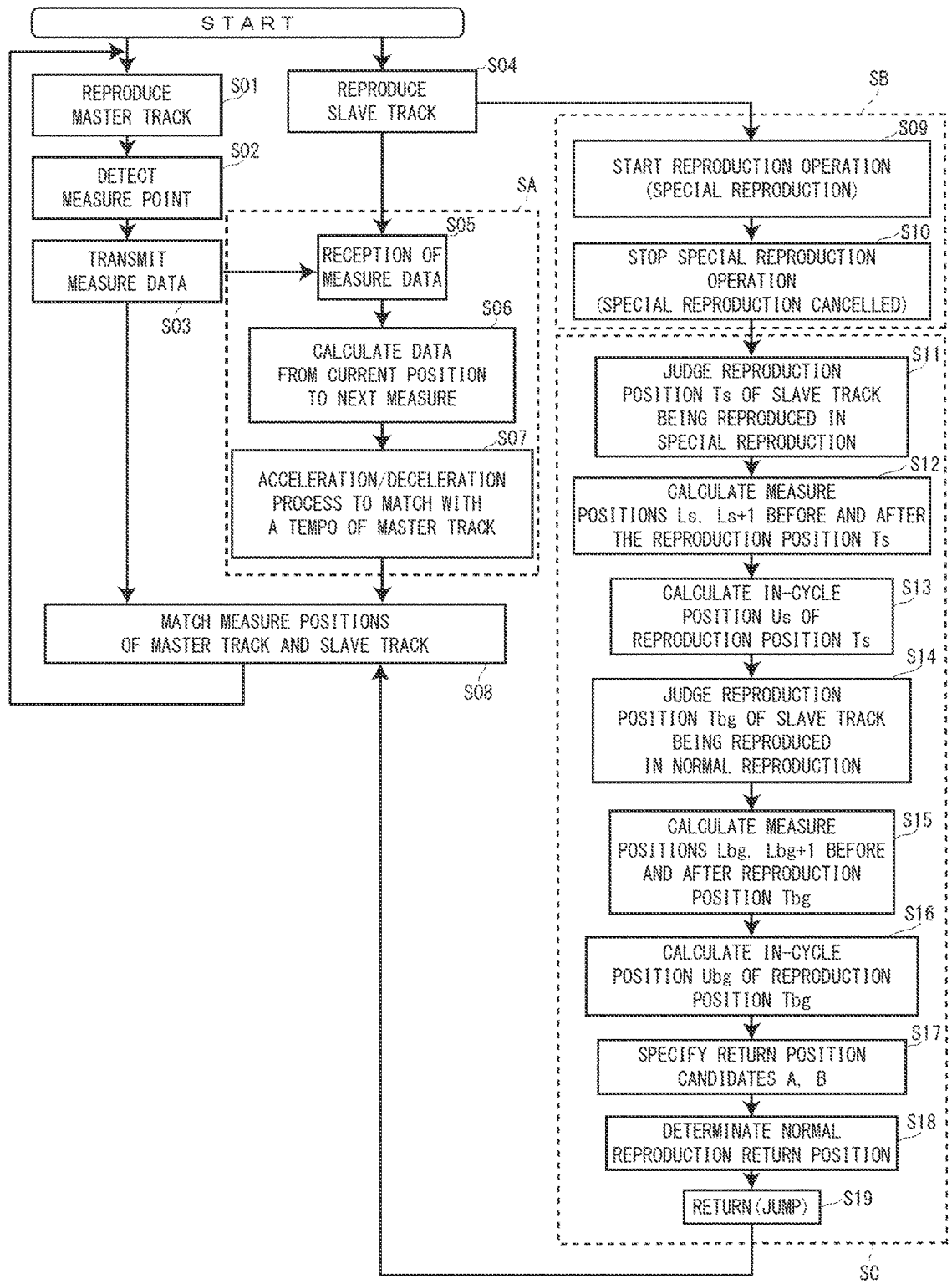
FIG. 6 is a flowchart illustrating a reproduction process according to the first embodiment.

Next, referring to FIG. 6, a reproduction process (reproduction method) of the reproduction system SY according to the embodiment will be explained. First, the master reproduction section 121 reproduces a master track (S01), detects a measure point (current position) (S02), and transmits a measure data to the next measure (such as time to the next measure, reproduction position information) based on the measure information stored in the memory 13 to the slave reproduction section 221 (S03).

While, the slave reproduction section 221 is reproducing a slave track (S04), receives the measure data from the master reproduction section 121 (S05), calculates data (such as time) from a current position (current reproduction position) to the next measure (S06), and performs an acceleration/deceleration process to match with a tempo of the master track (S07). For example, the acceleration process is performed when the calculated data amount (number of samples) is larger than the received measure data, and the deceleration process is performed in a reverse situation. Repetition of these processes enables measure positions of the master track and the slave track to match (S08, automatic synchronization function). S05 to S07 (symbol SA) indicate back side processes by the background reproduction section. Further, S01 to S08 indicate content reproduction steps in claims.

The return process after the special reproduction operation is started by the user (S09) and the special reproduction operation is completed at arbitrary timing (S10) will be explained hereinafter. S09 and S10 (symbol SB) indicate the front side process by the slave front side reproduction section, a special reproduction operation step and a special reproduction process step in claims. First, the return process section 250 judges the reproduction position Ts of the slave track being reproduced in special reproduction (S11, see FIG. 4). Then, measure positions Ls, Ls+1 (a start position and a stop position of a measure where the reproduction position Ts is included) before and after the reproduction position Ts are calculated (S12, see FIG. 4). The in-cycle position Us (in-measure position) of the reproduction position Ts is calculated by these steps S11 and S12 (S13, see FIG. 4).

Further, the return process section 250 judges the reproduction position Tbg of the slave track being reproduced in the normal reproduction by the background reproduction section (S14, see FIG. 4). Then, measure positions Lbg, Lbg+1 before and after the reproduction position Tbg are calculated (S15, see FIG. 4). The in-cycle position Ubg (in-measure position) of the reproduction position Tbg is calculated by these steps S14 and S15 (S16, see FIG. 4).

Then, the return process section 250 specifies the return position candidates A, B (S17) based on results of S13 and S16. For example, in case that the in-cycle position Us and the in-cycle position Ubg have a positional relationship illustrated in FIG. 7A, the return position candidates A, B are specified as illustrated. Shortly, the return position candidate A is the in-cycle position Ubg existing just before the reproduction position Ts given that the in-cycle position Ubg is plotted in each measure, respectively. On the other hand, the return position candidate B is the in-cycle position Ubg existing just after the reproduction position Ts given that the in-cycle position Ubg is plotted in each measure, respectively. Thus, after specifying the return position candidates A, B, the normal reproduction return position is determined based of a pattern selected by the user (S18) and the slave track returns to the return position (S19). In other words, reproduction of the slave track starts from the normal reproduction return position. This makes the in-measure positions (cycle timing) of the master track and the slave track match accordingly (S08). S11 to S19 (symbol SC) indicate the return process (return process steps) by the return process section 250.

Next, referring to FIGS. 7A to 8B, the normal reproduction return position (referred as only "return position" hereinafter) defined based on each pattern will be explained in detail. FIGS. 7A and 7B are explanatory views of a case of the in-cycle position Ubg>the in-cycle position Us. FIG. 7A illustrates an arrangement image of the return position candidates A, B in this case.

Further, FIG. 7B illustrates the return position when each pattern is selected. Each pattern 1 to 4 is explained. First, the "pattern 1" is a pattern setting the return position candidate A as return position. In other words, the in-cycle position Ubg existing just before the reproduction position Ts is set as return reproduction position Ts and the return position candidate A is assumed as LA, the return position is set as Ts–LA. In the example illustrated in FIG. 5, when the pattern 1 is selected, the return position is not at 2.7 beat in the second measure illustrated but at 2.7 beat in the first measure since the reproduction position Ts is at the "first beat". The length of LA and the return position (return position candidate A) is calculated by the computation expression described in FIG. 7B.

Further, the "pattern 2" is a pattern setting the return position candidate B as return position. In other words, the in-cycle position Ubg existing just after the reproduction position Ts is set as return position. Accordingly, if a length between the reproduction position Ts and the return position candidate B is assumed as LB, the return position is set as Ts LB. The length of LB and the return position (return position candidate B) is calculated by the computation expression described in FIG. 7B.

Still further, the "pattern 3" is a pattern setting the return position candidate A or B which is closer to the reproduction position Ts as return position. Accordingly, the return position is the return position candidate A if LA<LB, and is the return position candidate B if LA>LB.

Moreover, the "pattern 4" is a pattern setting the return position candidate A or B which is included in a measure (cycle) where the reproduction position Ts belongs to as return position. In other words, the return position candidate A or B which satisfies a condition of X in a condition expression "Ls≤X<Ls+1" is set as return position. Therefore, in the example of FIG. 7A, the return position candidate B is set. Other condition expression "Ls<X≤Ls+1" may be used instead of "Ls≤X<Ls+1".

While, FIGS. 8A and 8B are explanatory views of a case of the in-cycle position Ubg<in-cycle position Us. FIG. 8A illustrates an arrangement image of the return position candidates A, B in this case. Further, FIG. 8B illustrates the return position when each pattern is selected. In the example of FIG. 8B, the computation expressions of the length LA between the reproduction position Ts and the return position candidate A, and the length LB between the reproduction position Ts and the return position candidate B are different from those described in FIG. 7B. Besides, since return positions when each pattern is selected are the same as described in FIG. 8B, the detailed explanation thereof is omitted.

As explained above, according to the first embodiment, when a special reproduction operation to the slave track is performed in a state that the master track and the slave track are reproduced in synchronization, the normal reproduction return position of the slave track is matched with the in-measure position of the slave track being reproduced in normal reproduction by the background process at the time of special reproduction cancellation. Consequently, it is possible to avoid the out-of-tempos of the master track and the slave track and to maintain the synchronized state. With this procedure, since the tempos are not collapsed by the special reproduction operation operated by even DJs at an entry level, there is no need to worry about that the atmosphere of a floor could become strange, and therefore the special reproduction can be incorporated in performances easily.

Further, since a pattern for determining the return position can be selected from the four patterns, it is possible to perform high performances in accordance with user's preference and needs. Still further, when the "pattern 3" is selected, since reproduction after cancelling the special reproduction can start from the closest position to the in-cycle position Us, it is possible to restart the normal reproduction from the position where the user desires.

The Second Embodiment

Next, referring to FIGS. 9 to 12, the second embodiment of the invention will be explained. In the first embodiment described above, the return position is determined based on the reproduction position Ts of the slave track when the special reproduction operation completes, but the embodiment differs in that the return position is determined based on an arbitrary position Tr assigned the user. Differences from the first embodiment will be explained herein below. In the embodiment, same numerals are labeled on similar portions in the first embodiment and the detailed explanation thereof is omitted. Further, modifications applied to the similar portions with those of the first embodiment are applied to the embodiment similarly.

The functional structure of the embodiment is such that a return position assignment section which assigns the above arbitrary position Tr is added in the slave deck 20 of FIG. 2 (not illustrated). The return position assignment section assigns the arbitrary position Tr as reproduction position (such as time, data, number of measures, number of beats) from the beginning of a slave track. Further, the assignment is implemented with the numerals 41 to 43 (the menu button, the rotary selector and the liquid crystal display) illustrated in FIG. 3.

Still further, the reproduction position judgement section 251 of the embodiment judges the reproduction position Tbg at a time of special reproduction cancellation of the slave track reproduced in normal reproduction by the background reproduction section. Also, the in-cycle position calculation section 252 of the embodiment calculates an in-cycle position Ur as a position in a measure of the assigned arbitrary position Tr and the in-cycle position Ubg as a position in a measure of the reproduction position Tbg. Furthermore, the return position candidate specifying section 253 of the embodiment specifies the return position candidate A as the in-cycle position Ubg existing just before the arbitrary position Tr and the return position candidate B as the in-cycle position Ubg existing just after the arbitrary position Tr given that the in-cycle position Ubg exists in each measure.

FIG. 9 illustrates an image diagram of the synchronized reproduction of the master track and the slave track according to the embodiment. In FIG. 9, numeral 60 indicates a period during which the special reproduction is performed. Further, the arbitrary position Tr is assigned in the eighth measure. As illustrated in FIG. 9, in case that the special reproduction operation starts in the second measure on the slave side and stops at the first beat in the second measure and the reproduction position of the master track at the time of operation completion is at 2.7 beat, the return process is performed such that the slave track starts not from the second measure where the reproduction position Ts at the time of operation completion is included but from the 2.7 beat in the eighth measure where the arbitrary position Tr is included. With this procedure, an out-of-position in each measure of the master track and the slave track can be corrected while the normal reproduction starts from the position assigned by the user. FIG. 9 illustrates an example that either one of the patterns 2 to 4 is selected by the return position selection section 240 (when the pattern 1 is selected, the return position is set at 2.7 beat in the seventh measure).

Figure 10:
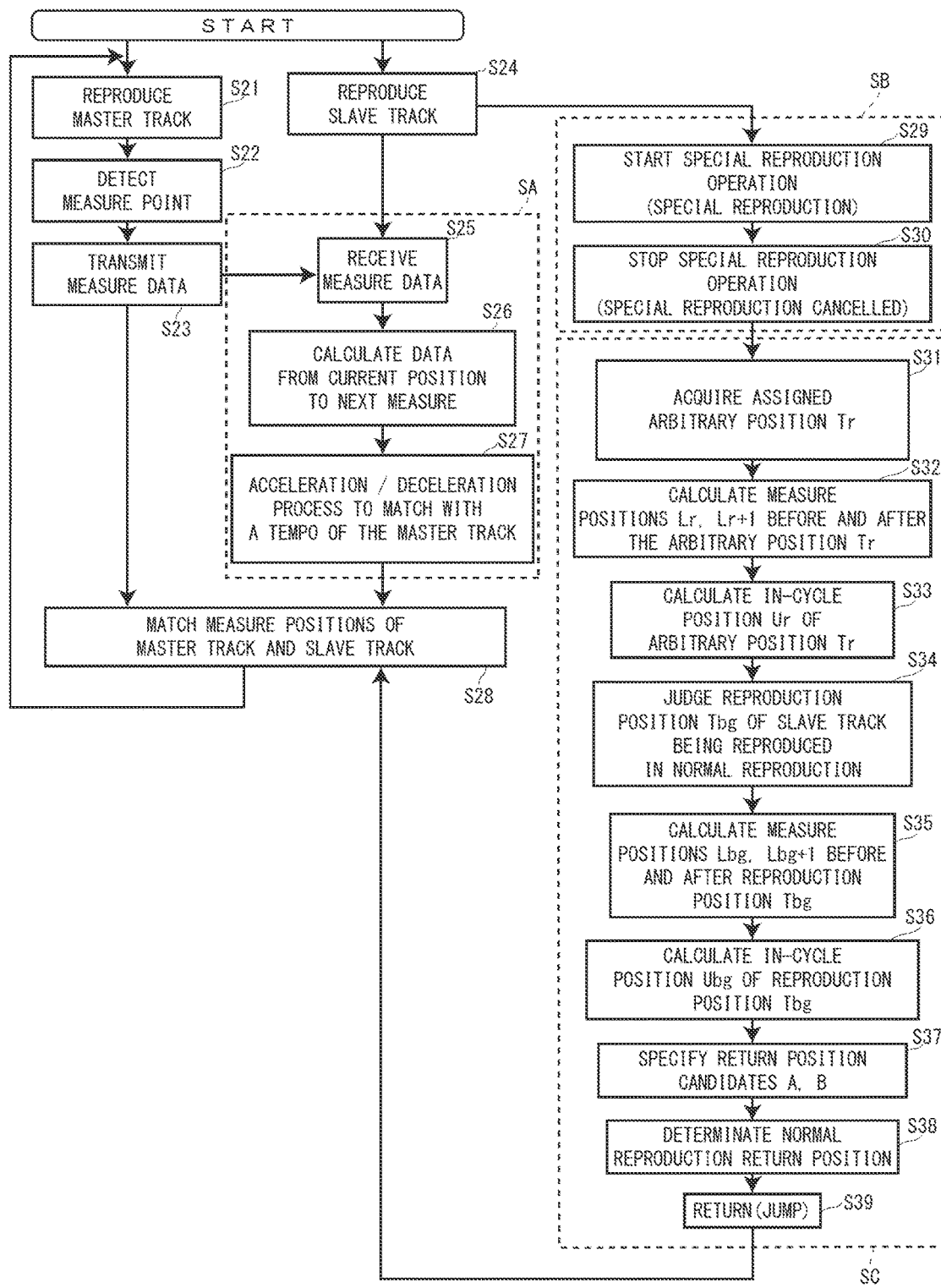
FIG. 10 is a flowchart of the reproduction process according to the second embodiment.

Next, referring to the flowchart in FIG. 10, a reproduction process of the reproduction system SY according to the embodiment will be explained. Since S21 to S30 are the same as S01 to S10 in the flowchart illustrated in FIG. 6, the return process only from S31 is explained. The return process section 250 of the embodiment acquires the assigned arbitrary position Tr from a predetermined memory area (for example, the memory 23) after the special reproduction is cancelled (S31). Then, measure positions Lr, Lr+1 before and after the arbitrary position Tr are calculated (S32, see FIGS. 11A to 12B). With these processes S31, S32, the in-cycle position Ur (in-measure position) of the reproduction position Tr is calculated (S33, see FIGS. 11A to 12B).

Then, in S33 to S36, the reproduction position Tbg of the slave track being reproduced in normal reproduction by the background reproduction section, the measure positions Lbg, Lbg+1 before and after the reproduction position Tbg, and the in-cycle position Ubg of the reproduction position Tbg are calculated, and the return position candidates A, B are specified based on the in-cycle positions Ur and Ubg in S37. The return position candidate A is the in-cycle position Ubg existing just before the arbitrary position Tr given that the in-cycle position Ubg is plotted in each measure, respectively. On the other hand, the return position candidate B is the in-cycle position Ubg existing just after the arbitrary position Tr given that the in-cycle position Ubg is plotted in each measure, respectively. Thus, after the return position candidates A, B are specified, the return position is determined based on the pattern selected by the user (S38), and the slave track returns to the return position (S39). With this procedure, it is possible to return to the arbitrary position Tr (vicinity thereof) desired by the user and to have a state in which measure positions (cycle timing) of the master track and the slave track match (S28).

FIGS. 11A to 12B are explanatory views of the return process according to the embodiment. FIGS. 11A and 11B indicate a case of the in-cycle position Ubg the in-cycle position Ur, and FIGS. 12A and 12B indicate a case of the in-cycle position Ubg<the in-cycle position Ur. FIGS. 11A and 12A illustrate arrangement images of the return position candidates A, B and FIGS. 11B and 12B illustrate the return positions when each pattern is selected. Since, in FIGS. 11A to 12B, the arbitrary position Tr, the in-cycle position Ur, the measure positions Lr, Lr+1 are replaced from the reproduction position Ts, the in-cycle position Us and the measure positions Ls, Ls+1 in FIGS. 7A to 8B of the first embodiment, the detailed explanation thereof is omitted.

As explained above, according to the reproduction system SY of the second embodiment, since a position as return candidate can be arbitrarily assigned, it is possible to move to other atmosphere without giving strange feeling while changing tunes with intention by the user or maintaining tempos. Further, since a pattern for determining the return position together with the arbitrary position Tr can be selected, it is possible to provide the reproduction system SY which is convenient for DJ beginners and experts.

In the second embodiment, the arbitrary position Tr is assigned as the reproduction position from the beginning of the slave track, but may be assigned as tune changing position (such as a verse start position, a climax start position) or a verse number (such as a start position of the first verse of a track, a start position of the second verse of a track).

The two embodiments are explained above, but modifications described below can be applied thereto. For example, in each embodiment described above, the master deck 10 functions as the master reproduction section 121 and the slave deck 20 functions as the slave reproduction section 221, but each deck 10, 20 is not necessarily functions as either one deck. For example, in case that the automatic synchronization function functions between the master deck 10 and the slave deck 20, when a B track starts to reproduce (S52) after an A track starts to reproduce by the master deck 10 (S51) as illustrated in FIG. 13, the master deck 10 functions as the master reproduction section 121 and the slave deck 20 functions as the slave reproduction section 221. However, in case that the master deck 10 starts to reproduce a C track (S53), the slave deck 20 functions as the master reproduction section 121 and the master deck 10 functions as the slave reproduction section 221. In short, the A track reproduced by the master deck 10 is a master track in a dotted line frame E01, and the B track reproduced by the slave deck 20 is a master track in a dotted line frame E02. Thus, a precedingly reproduced track may be treated as master track.

Further, in the embodiments above, though the reproduction system SY having the two decks of the master deck 10 and the slave deck 20 is exemplified, the reproduction system SY may be formed with a plurality of decks. In this case, the reproduction system SY may have a plurality of master decks 10 or may have a plurality of slave decks 20. Further, respective devices are not necessarily independent devices and the master reproduction section 121 and the slave reproduction section 221 may be implemented in one device (such as a player, a computer). Still further, one of the master reproduction section 121 and the slave reproduction section 221 may be implemented as a software program (application), the other may be implemented as a device, or both may be implemented as the software program.

Still further, in the above embodiments, the case where the master deck 10 and the slave deck 20 are connected by the cable 31 is exemplified, but may be connected via a network. In this case, a wired LAN, a wireless LAN, the Internet, a telephone line or the like may be used as network.

Still further, in case that communication delay occurs due to a network communication where the master deck 10 and the slave deck 20 are provided in an isolated location, it is preferable that the slave reproduction section 221 perform an acceleration/deceleration process to a slave track (to cancel the communication delay) in consideration of communication delay amount. In this case, a measurement method and an evaluation method of the communication delay amount do not have restrictions, such that the communication delay amount is measured by echo back, the acceleration/deceleration process is performed based on a preliminary set communication delay amount or the like.

Still further, in the embodiment above, the case where a cycle of a track is delimited by "measure (rhythm)" unit is exemplified, but may be delimited by other kinds of structure unit such as "beat", "phrase", "tune", "verse number". In terms of a "measure", quadruple rhythm is exemplified in the embodiment, but other rhythm such as triple rhythm may be used. The "tune" indicates a melody element such as an introduction, a verse, or a climax. A length of the structure unit is arbitrary such that a cycle of a track is not delimited by "one measure" unit but by "N measure" unit and by "1/N measure" unit (N is an integer satisfying N≥2). Moreover, a user may be capable of setting a type or the length of the structure unit arbitrarily.

Figure 14:
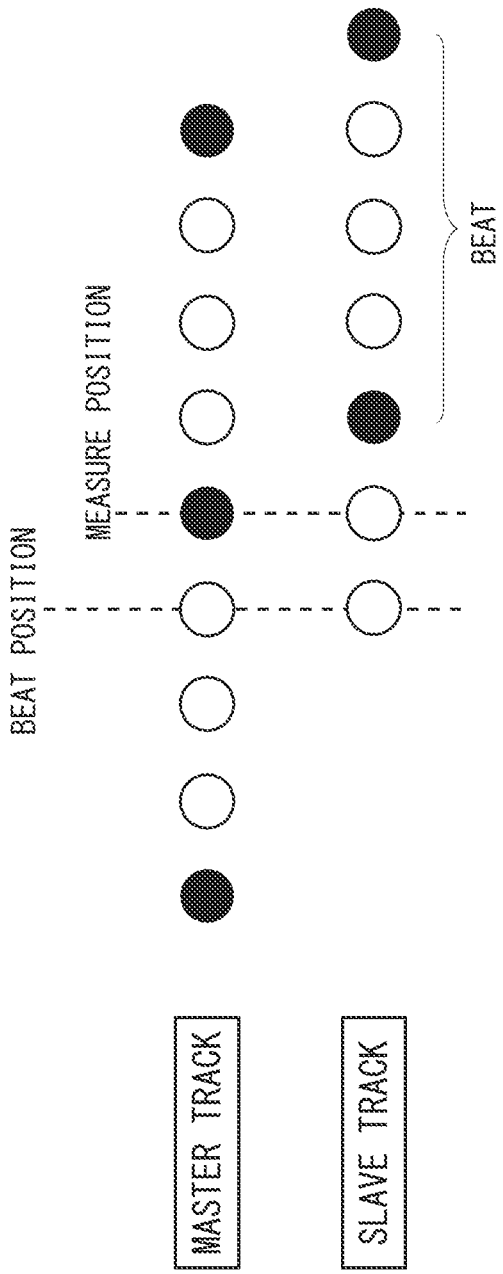
FIG. 14 is an image diagram illustrating a rhythm including accented beats and unaccented beats.
Figure 15:
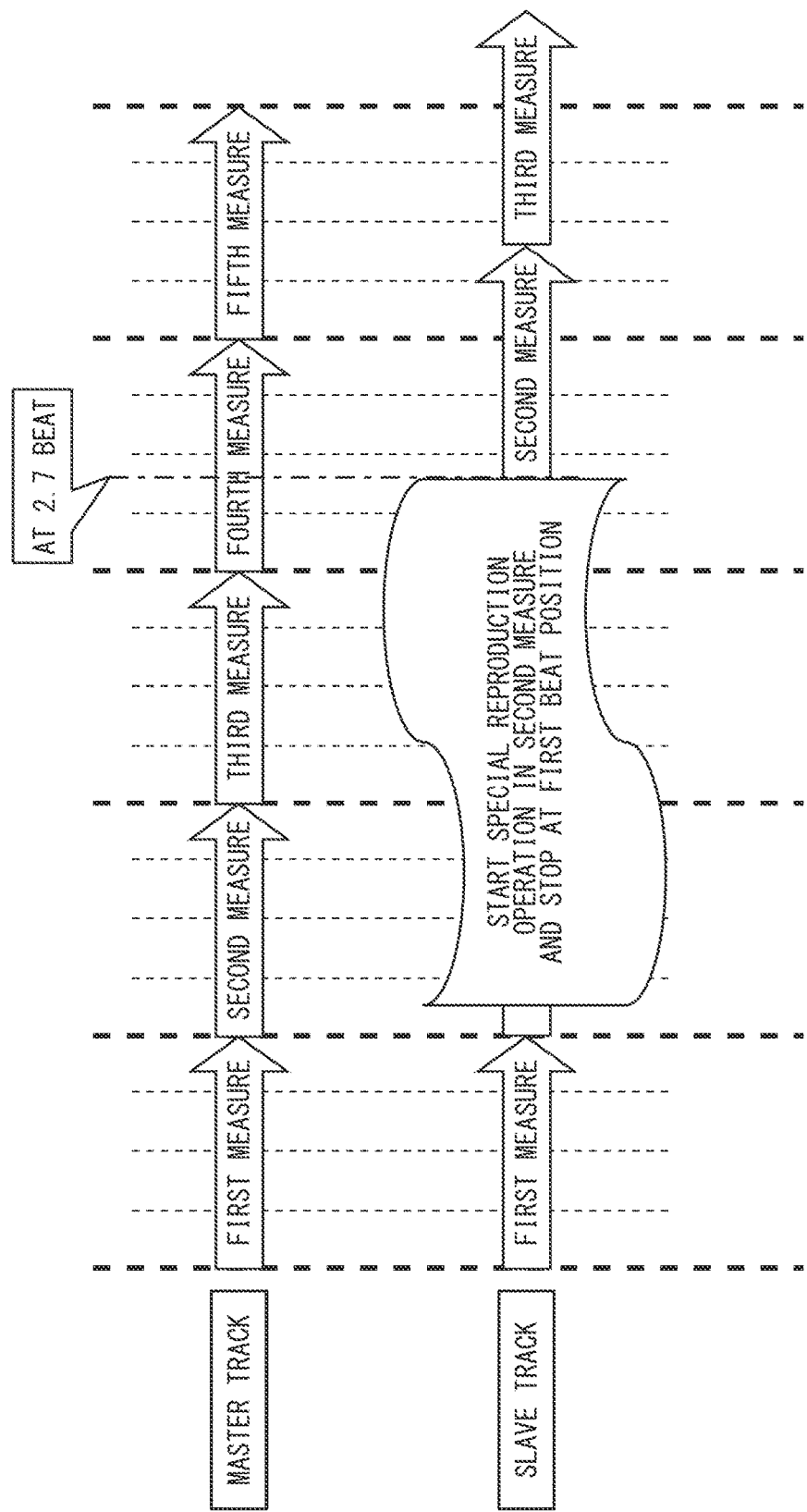
FIG. 15 is an image diagram of the synchronized reproduction according to a known example.

Still further, as illustrated in FIG. 14, in case that music has accented beats and subsequent unaccented beats (black circles indicate accented beats and white circles indicate unaccented beats), in other words, that the music has a "rhythm", when the return process is performed with a beat as a cycle (the cycle timing of the master track and the slave track are matched), each beat cycle matches but rhythm cycle does not match. Therefore, when the structure unit is selected for such music, it is preferable to display to prompt to select a "measure (rhythm)" as structure unit on the display 43.

Still further, in the embodiments described above, the case where the music contents are used is exemplified, but the embodiments can be applied to video contents. In this case, it is necessary that the video contents have periodicity because of any factor. For example, when the cycle is set as an interval of a "beat", video contents generated with video effect based on beat information could be conceived. Also, various effects such as enlargement/contraction, puzzle, coloring, gradation, strobe, lens flare, wiping, inversion, negative could be conceived. Besides, in case of video contents, a cycle may be delimited by chapter or number of frames. The embodiments can be applied to a commercial film where a video content having predetermined time length is reproduced repeatedly.

Still further, a VJ device has been known as device capable of implementing the video effect above. The VJ device is used for video performances by an operator called as a visual jockey or a video jockey (VJ) and is used for displaying videos on a monitor in conjunction with music with a beat in a club or the like. Shortly, the VJ device is a DJ device specialized in video contents. Therefore, the out-of-tempos with a music content or other video content makes the floor atmosphere spoil, as in the case of the DJ device. Accordingly, by applying the embodiments to the VJ device, it is possible to avoid the out-of-tempos with a master content (music content or video content) even when the special reproduction operation is performed on the video content, leading to maintain excitement in the floor. The embodiments can also be applied to, not to mention, a DVJ device (dealing with audio contents and video contents) having the DJ device and the VJ device.

Still further, in the embodiments above, the case where the master reproduction section 121 and the slave reproduction section 221 exist and two contents are reproduced in synchronization is presupposed, but the two content reproduction sections 120 and 220 are not necessarily needed and the synchronized reproduction is not necessarily needed. In other words, the invention can be implemented only with functions of the slave deck 20 side. For example, a situation where the content reproduction section 220 reproduces a content based on beat sound (with same PPM) is assumed while the beat sound is reproduced. In this case, when the special reproduction operation is performed on the content, a tempo (such as a measure position or a beat position) of the beat sound does not correspond to a tempo of the content. For this reason, in case that the special reproduction operation is performed, the normal reproduction of the content is performed by the background reproduction section, and the normal reproduction return position of the content is matched with a position at which cycle timing of the content being reproduced in normal reproduction by the background reproduction section matches at a time of special reproduction cancellation, which enables the out-of tempos with the beat sound to be cancelled. Thus, even if the special reproduction operation is performed in a state that one content is being reproduced, it is possible to keep up the tempo of the content surely.

Still further, in the embodiments above, the case where the background reproduction process is performed as back side process (the method of monitoring the normal reproduction) of the slave reproduction section 221 is exemplified, but the reproduction is not necessarily performed and it is enough only to count progress of the normal reproduction by any method.

Still further, in the embodiments above, the reproduction starts from the return position on a basis of the reproduction position Us at the time of special reproduction cancellation or from the return position on a basis of the assigned arbitrary position Tr respectively, but may start from a reproduction position itself at the time of the normal reproduction. For example, in the case illustrated in FIG. 5, the normal reproduction return position of the slave track may be matched with the reproduction position (at 2.7 beat in the fourth measure) of the master track.

Finally, each section and each function of the reproduction system SY illustrated in the above may be provided in a storage medium (such as a CD-ROM, a flash memory). In other words, a program which makes a computer function as each section of the reproduction system SY and a recording medium in which the program is recorded are included in a scope of rights of the invention. In addition to the embodiments described above, any modifications of system structure, process steps or the like of the reproduction system SY are applicable in a range without departing from a scope of the invention.

REFERENCE NUMERALS

10: master deck 20: slave deck 31: cable 110: master side communication section 120: content reproduction section 121: master reproduction section 210: slave side communication section 220: content reproduction section 221: slave reproduction section 230: special reproduction operation section 235: special reproduction process section 240: return position selection section 250: return process section A, B: return position candidate SY: reproduction system Tbg: reproduction position of a track in a normal reproduction Ts: reproduction position of a track in a special reproduction Tr: arbitrary position Ubg: in-cycle position of reproduction position Tbg Us: in-cycle position of reproduction position Ts

What is claimed is:
1. A reproduction system, comprising:
a special reproduction instruction section configured to, during normal reproduction of a plurality of contents having periodicity where the plurality of con tents are reproduced in synchronization and with a predetermined cycle, generate an instruction to perform special reproduction on a first content of the plurality of contents to disturb periodicity of the first content with respect to other contents of the plurality of contents being reproduced;
a special reproduction process section that performs the special reproduction on the first content based on an instruction from the special reproduction instruction section; and
a return process section that matches a normal reproduction return position of the first content that is subject to the special reproduction, with a position corresponding to a timing of the cycle of the other contents that are not subject to the special reproduction, upon occurrence of a cancellation of the special reproduction,
wherein the return process section
judges a reproduction position Ts of the first content at a time of the occurrence of the cancellation of the special reproduction of the first content,
judges a reproduction position Tbg of the other contents at the time of the occurrence of the cancellation of the special reproduction of the first content, and
determines the normal reproduction return position from any one of
i) a return position candidate A as an in-cycle position Ubg indicating a position in a cycle of the reproduction position Tbg existing just before the reproduction position Ts,
ii) a return position candidate B as an in-cycle position Ubg existing just after the reproduction position Ts,
iii) a return position candidate C corresponding to one of the return candidates A or B that is closer to the reproduction position Ts, and
iv) a return position candidate D corresponding to one of the return candidates A or B that is included in the cycle where the reproduction position Ts belongs to; and
a return section that matches a reproduction position of the first content reproduced in special reproduction with the determined normal reproduction return position.
2. A reproduction system, comprising:
a special reproduction instruction section configured to, during normal reproduction of a plurality of contents having periodicity where the plurality of contents are reproduced in synchronization and with a predetermined cycle, generate an instruction to perform special reproduction on a first content of the plurality of contents to disturb periodicity of the first content with respect to other contents of the plurality of contents being reproduced;
a special reproduction process section that performs the special reproduction on the first content based on an instruction from the special reproduction instruction section;
a return process section that matches a normal reproduction return position of the first content that is subject to the special reproduction, with a position corresponding to a timing of the cycle of the other contents that are not subject to the special reproduction, upon occurrence of a cancellation of the special reproduction; and
a return target position assignment section that assigns an arbitrary position Tr in the first content as a return target position,
wherein the return process section
judges a reproduction position Tbg of the other contents at a time of the occurrence of cancellation of the special reproduction, and
determines the normal reproduction return position from either one of four candidates of
i) a return position candidate A as an in-cycle position Ubg indicating a position of a cycle of the reproduction position Tbg existing just before the arbitrary position Tr,
ii) a return position candidate B as an in-cycle position Ubg existing just after the arbitrary position Tr,
iii) a return position candidate C corresponding to one of the return candidates A or B that is closer to the arbitrary position Tr, and
iv) a return position candidate D corresponding to one of the return candidates A or B that is included in the cycle where the arbitrary position Tr belongs to; and
a return section that adjusts a reproduction position of the first content reproduced in special reproduction to the determined normal reproduction return position.

3. A non-transitory computer-readable medium having stored thereon executable program code that, upon being read and executed by a processor device of a computer, causes the computer to function as:
a special reproduction instruction section configured to, during normal reproduction of a plurality of contents having periodicity where the plurality of contents are reproduced in synchronization and with a predetermined cycle, generate an instruction to perform special reproduction on a first content of the plurality of contents to disturb periodicity of the first content with respect to other contents of the plurality of contents being reproduced;
a special reproduction process section that performs the special reproduction on the first content based on an instruction from the special reproduction instruction section; and
a return process section that matches a normal reproduction return position of the first content that is subject to the special reproduction, with a position corresponding to a timing of the cycle of the other contents that are not subject to the special reproduction, upon occurrence of a cancellation of the special reproduction,
wherein the return process section
judges a reproduction position Ts of the first content at a time of the occurrence of the cancellation of the special reproduction of the first content,
judges a reproduction position Tbg of the other contents at the time of the occurrence of the cancellation of the special reproduction of the first content, and
determines the normal reproduction return position from any one of
i) a return position candidate A as an in-cycle position Ubg indicating a position in a cycle of the reproduction position Tbg existing just before the reproduction position Ts,
ii) a return position candidate B as an in-cycle position Ubg existing just after the reproduction position Ts,
iii) a return position candidate C corresponding to one of the return candidates A or B that is closer to the reproduction position Ts, and
iv) a return position candidate D corresponding to one of the return candidates A or B that is included in the cycle where the reproduction position Ts belongs to; and
a return section that matches a reproduction position of the first content reproduced in special reproduction with the determined normal reproduction return position.

4. A non-transitory computer-readable medium having stored thereon executable program code that, upon being read and executed by a processor device of a computer, causes the computer to function as:
a special reproduction instruction section configured to, during normal reproduction of a plurality of contents having periodicity where the plurality of contents are reproduced in synchronization and with a predetermined cycle, generate an instruction to perform special reproduction on a first content of the plurality of contents to disturb periodicity of the first content with respect to other contents of the plurality of contents being reproduced;
a special reproduction process section that performs the special reproduction on the first content based on an instruction from the special reproduction instruction section;
a return process section that matches a normal reproduction return position of the first content that is subject to the special reproduction, with a position corresponding to a timing of the cycle of the other contents that are not subject to the special reproduction, upon occurrence of a cancellation of the special reproduction; and
a return target position assignment section that assigns an arbitrary position Tr in the first content as a return target position,
wherein the return process section
judges a reproduction position Tbg of the other contents at a time of the occurrence of cancellation of the special reproduction, and
determines the normal reproduction return position from either one of four candidates of
i) a return position candidate A as an in-cycle position Ubg indicating a position of a cycle of the reproduction position Tbg existing just before the arbitrary position Tr,
ii) a return position candidate B as an in-cycle position Ubg existing just after the arbitrary position Tr,
iii) a return position candidate C corresponding to one of the return candidates A or B that is closer to the arbitrary position Tr, and iv) a return position candidate D corresponding to one of the return candidates A or B that is included in the cycle where the arbitrary position Tr belongs to; and a return section that adjusts a reproduction position of the first content reproduced in special reproduction to the determined normal reproduction return position.

* * * * *